US 12,050,983 B2

(12) United States Patent
Chowdhery et al.

(10) Patent No.: US 12,050,983 B2
(45) Date of Patent: Jul. 30, 2024

(54) ATTENTION NEURAL NETWORKS WITH PARALLEL ATTENTION AND FEED-FORWARD LAYERS

(71) Applicant: Google LLC, Mountain View, CA (US)

(72) Inventors: Aakanksha Chowdhery, Mountain View, CA (US); Jacob Daniel Devlin, Ft. Myers, FL (US); Sharan Narang, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/130,335

(22) Filed: Apr. 3, 2023

(65) Prior Publication Data

US 2023/0316055 A1 Oct. 5, 2023

Related U.S. Application Data

(60) Provisional application No. 63/326,764, filed on Apr. 1, 2022.

(51) Int. Cl.
*G06N 3/0499* (2023.01)
(52) U.S. Cl.
CPC .................. *G06N 3/0499* (2023.01)
(58) Field of Classification Search
CPC ................................ G06N 3/0499
See application file for complete search history.

(56) References Cited

U.S. PATENT DOCUMENTS

| 2021/0248473 | A1 | 8/2021 | Shazeer |
| 2021/0279576 | A1 | 9/2021 | Shazeer et al. |
| 2022/0215832 | A1* | 7/2022 | Ren ............ G10L 15/16 |
| 2022/0292266 | A1* | 9/2022 | Dey ............ G06N 3/0455 |

OTHER PUBLICATIONS

Su et al. Roformer: Enhanced Transformer With Rotary Position Embedding. Apr. 21, 2021 (Year: 2021).*
Abadi et al., "TensorFlow: A system for large-scale machine learning" In 12th USENIX Symposium on Operating Systems Design and Implementation (OSDI), Savannah, GA, Nov. 2016, 265-283.
Abid et al., "Persistent anti-muslim bias in large language models" CoRR, Submitted on Jan. 2021, arXiv:2101.05783v1, 17 pages.
Adiwardana et al., "Towards a human-like open-domain chatbot" CoRR, Submitted on Jan. 2020, arXiv:2001.09977v1, 38 pages.
Agrawal et al., "TensorFlow Eager: A multi-stage, Pythonembedded DSL for machine learning" CoRR, Submitted on Feb. 2019, arXiv:1903. 01855v1, 12 pages.
Akidau et al., "Mill-Wheel: Fault-tolerant stream processing at internet scale" Proc. VLDB Endow., 6(11):, Aug. 2013, 12 pages.
(Continued)

*Primary Examiner* — Alexey Shmatov
*Assistant Examiner* — Robert Bejcek, II
(74) *Attorney, Agent, or Firm* — Fish & Richardson P.C.

(57) ABSTRACT

Methods, systems, and apparatus, including computer programs encoded on computer storage media, for performing a machine learning task on a network input to generate a network output. One of the systems comprises an attention neural network configured to perform the machine learning task, the attention neural network comprising a plurality of attention layers, each attention layer comprising an attention sub-layer that is arranged in parallel with a feed-forward sub-layer.

19 Claims, 4 Drawing Sheets

(56) References Cited

OTHER PUBLICATIONS

Allamanis, "The adverse effects of code duplication in machine learning models of code" CoRR, Submitted on Dec. 2018, arXiv:1812.06469v1, 8 pages.

Amini et al., "MathQA: Towards interpretable math word problem solving with operation-based formalisms" CoRR, Submitted on May 2019, arXiv:1905.13319v1, 11 pages.

Angel et al., "End-to-end performance isolation through virtual datacenters." 11th USENIX Symposium on Operating Systems Design and Implementation (OSDI 14), Oct. 2014, 233-248.

Anil et al., "Scalable second order optimization for deep learning" CoRR, Submitted on Mar. 2021, arXiv:2002.09018v2, 24 pages.

Ausavarungnirun et al., "Mask: Redesigning the GPU memory hierarchy to support multi-application concurrency" ACM SigPlan Notices, Mar. 2018, 53(2):503-518.

Austin et al., "Program synthesis with large language models" CoRR, Submitted on Aug. 2021, arXiv:2108.07732v1, 34 pages.

Bai et al., "PipeSwitch: Fast pipelined context switching for deep learning applications" In 14th USENIX Symposium on Operating Systems Design and Implementation (OSDI). USENIX Association, Nov. 2020, 499-514.

Bakshi et al., "Structure-to-text generation with self-training, acceptability classifiers and context-conditioning for the GEM shared task" In Proceedings of the 1st Workshop on Natural Language Generation, Evaluation, and Metrics (GEM 2021), Aug. 2021, 136-147.

Barham et al., "Machine learning systems are stuck in a rut" In Proceedings of the Workshop on HotTopics in Operating Systems (HotOS), Association for Computing Machinery, May 2019, 177-183.

Barham et al., "Pathways: Asynchronous distributed dataflow for ml." Proceedings of Machine Learning and Systems 4, Apr. 2022, 20 pages.

Barocas et al., "Designing Disaggregated Evaluations of AI Systems: Choices, Considerations, and Tradeoffs" In Proceedings of the 2021 AAAI/ACM Conference on AI, Ethics, and Society, Jul. 2021, 11 pages.

Baumann et al., "The multikernel: A new OS architecture for scalable multicore systems" In Proceedings of the ACM SIGOPS 22nd symposium on Operating systems principles, Oct. 2009, 14 pages.

Bender et al., "On the dangers of stochastic parrots: Can language models be too big?" Proceedings of the 2021 ACM conference on fairness, accountability, and transparency, Mar. 2021, 610-623.

Berant et al. Semantic parsing on freebase from question-answer pairs. In Proceedings of the 2013 conference on empirical methods in natural language processing, Oct. 2013, 1533-1544.

Bird et al., "NLTK: The natural language toolkit" In Proceedings of the ACL Interactive Poster and Demonstration Sessions, Jul. 2004, 4 pages.

Bisk et al., "PIQA: reasoning about physical commonsense in natural language" CoRR, Submitted on Nov. 2019, arXiv: 1911.11641v1, 9 pages.

Blodgett et al., "Language (technology) is power: A critical survey of "bias" in NLP" In Proceedings of the 58th Annual Meeting of the Association for Computational Linguistics, Jul. 2020, 5454-5476.

Blodgett et al., "Stereotyping Norwegian salmon: An inventory of pitfalls in fairness benchmark datasets" In Proceedings of the 59th Annual Meeting of the Association for Computational Linguistics and the 11th International Joint Conference on Natural Language Processing (vol. 1: Long Papers), Aug. 2021, 1004-1015.

Blog.google [onine], "Introducing Pathways: A next-generation AI architecture" Oct. 2021, retrieved on Nov. 21, 2023, retrieved from URL <https://blog.google/technology/ai/introducing-pathways-next-generation-ai-architecture/>, 4 pages.

Bommasani et al., "On the opportunities and risks of foundation models" CoRR, Submitted on Aug. 2021, arXiv:2108.07258v1, 211 pages.

Borgeaud et al., "Improving language models by retrieving from trillions of tokens" CoRR, Submitted on Dec. 2021, arXiv:2112.04426v1, 43 pages.

Brown et al., "Language Models are Few-Shot Learners" CoRR, Submitted on May 2020, arXiv:2005.14165v1, 72 pages.

Cao et al., "Toward gender-inclusive coreference resolution" In Proceedings of the 58th Annual Meeting of the Association for Computational Linguistics, Jul. 2020, 4568-4595.

Carlini et al., "Quantifying memorization across neural language models" CoRR, Submitted on Feb. 2022, arXiv:2202.07646v1, 20 pages.

Caswell et al., "Tagged Back-Translation" Proceedings of the Fourth Conference on Machine Translation (vol. 1: Research Papers), Aug. 2019, 53-63.

Chaudhary et al., Balancing efficiency and fairness in heterogeneous GPU clusters for deep learning. In Proceedings of the Fifteenth European Conference on Computer Systems (EuroSys). Association for Computing Machinery, Apr. 2020, 16 pages.

Chen et al., "Evaluating large language models trained on code" CoRR, Submitted on Jul. 2021, arXiv:2107.03374v1, 35 pages.

Chen et al., "TVM: An automated end-to-end optimizing compiler for deep learning" In 13th USENIX Symposium on Operating Systems Design and Implementation (OSDI), Carlsbad, CA, Oct. 2018, 579-594.

Child et al., "Generating long sequences with sparse transformers" CoRR, Submitted on Apr. 2019, arXiv: 1904.10509v1, 10 pages.

Choi et al., "Quac : Question answering in context" CoRR, Submitted on Aug. 2018, arXiv:1808.07036v1, 11 pages.

Choromanski et al., "Rethinking attention with performers" CoRR, Submitted on Sep. 2020, arXiv:2009.14794v1, 36 pages.

Clark et al., "Think you have solved question answering? Try ARC, the AI2 reasoning challenge" CoRR, Submitted on Mar. 2018, arXiv:1803.05457v1, 10 pages.

Clark et al., "TyDi QA: A Benchmark for Information-Seeking Question Answering in Typologically Diverse Languages" CoRR, Submitted on Mar. 2020, arXiv:2003.05002, 17 pages.

Clarke et al., "The MPI message passing interface standard" The International Journal of Supercomputing Applications, May 1996, 6 pages.

Cloud.Google.com [online], "Cloud Tensor Processing Units (TPUs)" May 2017, retrieved on Nov. 21, 2023, retrieved from URL <https://cloud.google.com/tpu>, 10 pages.

Cloud.google.com [online], "InfoType detector reference" Mar. 2019, retrieved on Nov. 17, 2023, retrieved from URL <https://cloud.google.com/dlp/docs/infotypes-reference>, 23 pages.

Cobbe et al., "Training verifiers to solve math word problems" CoRR, Submitted on Oct. 2021, arXiv:2110.14168v1, 22 pages.

Contentcloud.google.com [online], "Classifying Content" Aug. 2019, retrieved on Nov. 17, 2023, retrieved from URL <https://cloud.google.com/natural-language/docs/classifying-text>, 3 pages.

Crankshaw et al., "Clipper: A low-latency online prediction serving system" In 14th USENIX Symposium on Networked Systems Design and Implementation (NSDI), Mar. 2017, 613-627.

Dai, et al., "Transformer-XL: Attentive Language Models Beyond a Fixed-Length Context," CoRR, Submitted on Jan. 2019, arXiv: 1901.02860v1, 18 pages.

Dev et al., "Harms of gender exclusivity and challenges in non-binary representation in language technologies" In Proceedings of the 2021 Conference on Empirical Methods in Natural Language Processing, Nov. 2021, 1968-1994.

Dev et al., "On measuring and mitigating biased inferences of word embeddings" CoRR, Submitted on Aug. 2019, arXiv:1908.09369v1, 11 pages.

Dev et al., "What do bias measures measure?" CoRR, Submitted on Aug. 2021, arXiv:2108.03362v1, 16 pages.

Developer.download.nvidia.com [online], "NVIDIA GPUDirect technology" 2012, retrieved on Nov. 21, 2023, retrieved from URL <https://developer.download.nvidia.com/devzone/devcenter/cuda/docs/GPUDirect_Technology_Overview.pdf>, 20 pages.

Devlin et al., "BERT: Pre-training of deep bidirectional transformers for language understanding" In Proceedings of the 2019 Conference of the North American Chapter of the Association for Computational Linguistics: Human Language Technologies, vol. 1 (Long and Short Papers), Jun. 2019, 4171-4186.

(56) References Cited

OTHER PUBLICATIONS

Dixon et al., "Measuring and mitigating unintended bias in text classification." Proceedings of the 2018 AAAI/ACM Conference on AI, Ethics, and Society, Feb. 2018, 67-73.
Dodge et al., "Documenting large webtext corpora: A case study on the colossal clean crawled corpus" In Proceedings of the 2021 Conference on Empirical Methods in Natural Language Processing, Nov. 2021, 1286-1305.
Du et al., "GLaM: Efficient scaling of language models with mixture-of-experts" CoRR, Submitted on Dec. 2021, arXiv:2112.06905v1, 23 pages.
Dua et al., "Drop: A reading comprehension benchmark requiring discrete reasoning over paragraphs" In Proceedings of the 2019 Conference of the North American Chapter of the Association for Computational Linguistics: Human Language Technologies, vol. 1 (Long and Short Papers), Jun. 2019, 2368-2378.
Dusek et al., "Neural generation for czech: Data and baselines" CoRR, Submitted on Oct. 2019, arXiv: 1910.05298v1, 12 pages.
Dusek et al., "Semantic Noise Matters for Neural Natural Language Generation" In Proceedings of the 12th International Conference on Natural Language Generation (INLG 2019), Nov. 2019, 421-426.
Edunov et al., "Understanding back-translation at scale" In Proceedings of the 2018 Conference on Empirical Methods in Natural Language Processing, Nov. 2018, 489-500.
Fan et al., "Beyond english-centric multilingual machine translation" CoRR, Submitted on Oct. 2020, arXiv:2010.11125v1, 38 pages.
Fedus et al., "Switch transformers: Scaling to trillion parameter models with simple and efficient sparsity" CoRR, Submitted on Jan. 2021, arXiv:2101.03961v1, 31 pages.
Feitelson et al., "Gang scheduling performance benefits for fine-grain synchronization" Journal of Parallel and Distributed Computing, Dec. 1992, 16(4):306-318.
Ferreira et al., "The 2020 bilingual, bi-directional webnlg+ shared task overview and evaluation results (webnlg+ 2020)" In Proceedings of the 3rd WebNLG Workshop on Natural Language Generation from the Semantic Web (WebNLG+ 2020), Feb. 2021, 22 pages.
Foley et al., "Ultra-performance Pascal GPU and NVLink interconnect" IEEE Micro, Mar. 2017, 37(2):7-17.
Freitag et al., "Complete multilingual neural machine translation" CoRR, Submitted on Oct. 2020, arXiv:2010.10239v1, 11 pages.
Gale et al., "The state of sparsity in deep neural networks" CoRR, Submitted on Feb. 2019, arXiv: 1902.09574v1, 15 pages.
Gardent et al., "Creating training corpora for nlg micro-planning. " 55th annual meeting of the Association for Computational Linguistics (vol. 1: Long Papers), Jul. 2017, 9 pages.
Gebru et al., "Datasheets for datasets." CoRR, Submitted on Mar. 2018, arXiv:1803.09010v1, 26 pages.
Gehman et al., "Realtoxicityprompts: Evaluating neural toxic degeneration in language models" CoRR, Submitted on Sep. 2020, arXiv:2009.11462v1, 24 pages.
Gehrmann et al., "Repairing the cracked foundation: A survey of obstacles in evaluation practices for generated text" CoRR, Submitted on Feb. 2022, arXiv:2202.06935v1, 41 pages.
Gehrmann et al., "The GEM benchmark: Natural language generation, its evaluation and metrics." In Proceedings of the 1st Workshop on Natural Language Generation, Evaluation, and Metrics (GEM 2021), Aug. 2021, 96-120.
Geirhos et al., "Shortcut learning in deep neural networks" CoRR, Submitted on Apr. 2020, arXiv:2004.07780v1, 27 pages.
Geva et al., "Did aristotle use a laptop? A question answering benchmark with implicit reasoning strategies" CoRR, Submitted on Jan. 2021, arXiv:2101.02235v1, 15 pages.
Github.com [online], "BIG-bench" Jan. 2021, retrieved on Nov. 16, 2023, retrieved from URL <https://github.com/google/BIG-bench/>, 11 pages.
Github.com [online], "Flax: A neural network library and ecosystem for JAX" May 2020, retrieved on Nov. 21, 2023, retrieved from URL <http://github.com/google/flax>, 5 pages.
Github.com [online], "Jax" Nov. 2018, retrieved on Nov. 16, 2023, retrieved from URL <https://github.com/google/jax>, 11 pages.
Github.com [online], "Megatron-LM" May 2019, retrieved on Nov. 17, 2023, retrieved from URL <www.Github.com/NVIDIA/Megatron-LM>, 20 pages.
Github.com [online], "Mesh Transformer Jax" Jun. 2021, retrieved on Nov. 17, 2023, retrieved from URL <https://github.com/kingoflolz/mesh-transformer-jax>, 8 pages.
Github.com [online], "T5x" Nov. 2021, retrieved on Nov. 16, 2023, retrieved from URL <Github.com/Google-research/t5x>, 12 pages.
Gupta et al., "Deepfix: Fixing common C language errors by deep learning" Proceedings of the Thirty-First AAAI Conference on Artificial Intelligence, Feb. 4-9, 2011, 1345-1351.
Gupta et al., "Pegasus: Coordinated scheduling for virtualized accelerator-based systems" In 2011 USENIX Annual Technical Conference (Usenix Atc), vol. 31, 2011, 14 pages.
Gupta et al., "Shampoo: Preconditioned stochastic tensor optimization" International Conference on Machine Learning, PMLR, Jul. 2018, 9 pages.
Guu et al., "Retrieval augmented language model pre-training." International conference on machine learning. PMLR, Nov. 2020, 10 pages.
He et al., "Deep residual learning for image recognition" In 2016 IEEE Conference on Computer Vision and Pattern Recognition, 2016, 770-778.
Hinton et al., "Matrix capsules with EM routing" In International conference on learning representations, Feb. 2018, 15 pages.
Hoffmann et al., "Training compute-optimal large language models" CoRR, Submitted on Mar. 2022, arXiv:2203.15556v1, 36 pages.
Houlsby et al., "Parameter-efficient transfer learning for NLP" In International Conference on Machine Learning. PMLR, May 2019, 10 pages.
Huang et al., "GPipe: Efficient training of giant neural networks using pipeline parallelism" In Advances in neural information processing systems, 2019, 10 pages.
Hutchinson et al., "Social biases in nlp models as barriers for persons with disabilities" In Proceedings of the 58th Annual Meeting of the Association for Computational Linguistics, Jul. 2020, 5491-5501.
International Search Report and Written Opinion in International Appln. No. PCT/US2023/017328, mailed on Jun. 28, 2023, 20 pages.
Jacobs et al., "Measurement and fairness" In Proceedings of the 2021 ACM Conference on Fairness, Accountability, and Transparency, FAccT '21, Mar. 2021, 375-385.
Jeon et al., "Analysis of large-scale multi-tenant GPU clusters for DNN training workloads" In 2019 USENIX Annual Technical Conference (Usenix Atc), Jul. 2019, 947-960.
Jeon et al., "Multi-tenant GPU clusters for deep learning workloads: Analysis and implications" Technical report, Microsoft Research, May 2018, 14 pages.
Jia et al., "Improving the accuracy, scalability, and performance of graph neural networks with Roc" Proceedings of Machine Learning and Systems, Mar. 2020, 12 pages.
Joshi et al., "TriviaQA: A large scale distantly supervised challenge dataset for reading comprehension" In Proceedings of the 55th Annual Meeting of the Association for Computational Linguistics (vol. 1: Long Papers), Jul. 2017, 1601-1611.
Jouppi et al., "A Domain-specific supercomputer for training deep neural networks" Communications of the ACM, 63(7): Jun. 2020, 67-78.
Kandpal et al., "Deduplicating training data mitigates privacy risks in language models" CoRR, Submitted on Feb. 2022, arXiv:2202.06539v1, 9 pages.
Kaplan et al., "Scaling laws for neural language models" CoRR, Submitted on Jan. 2020, arXiv:2001.08361v1, 30 pages.
Kingma et al., "Adam: A method for stochastic optimization" CoRR, Submitted on Dec. 2014, arXiv: 1412.6980v1, 9 pages.
Kirk, "Nvidia Cuda software and GPU parallel computing architecture" In Proceedings of the 6th International Symposium on Memory Management (ISMM), Oct. 2007, 64 pages.
Kitaev et al., "Reformer: The efficient transformer" CoRR, Submitted on Jan. 2020, arXiv:2001.04451v1, 11 pages.

(56) References Cited

OTHER PUBLICATIONS

Koncel-Kedziorski et al., "MAWPS: A math word problem repository" In Proceedings of the 2016 Conference of the North American Chapter of the Association for Computational Linguistics: Human Language Technologies, Jun. 2016, 1152-1157.
Krizhevsky et al., "ImageNet classification with deep convolutional neural networks" In Advances in Neural Information Processing Systems, vol. 25, 2012, 9 pages.
Kudo et al., "A simple and language independent subword tokenizer and detokenizer for neural text processing" In Proceedings of the 2018 Conference on Empirical Methods in Natural Language Processing: System Demonstrations, Nov. 2018, 66-71.
Kulal et al., "SPOC: Search-based pseudocode to code" In Advances in Neural Information Processing Systems, Jun. 2019, 12 pages.
Kurita et al., "Quantifying social biases in contextual word representations" 1st AGL Workshop on Gender Bias for Natural Language Processing, Aug. 2019, 7 pages.
Kwiatkowski et al., "Natural Questions: A benchmark for question answering research" Transactions of the Association for Computational Linguistics, vol. 7, Aug. 2019, 453-466.
Kwon et al., "Nimble: Lightweight and parallel gpu task scheduling for deep learning." Advances in Neural Information Processing Systems 33, 2020, 12 pages.
Lachaux et al., "Unsupervised translation of programming languages" CoRR, Submitted on Jun. 2020, arXiv:2006.03511v1, 21 pages.
Ladhak et al., "WikiLingua: A new benchmark dataset for crosslingual abstractive summarization" In Findings of the Association for Computational Linguistics: EMNLP, Nov. 2020, 4034-4048.
Lai et al., "Race: Large-scale Reading comprehension dataset from examinations" In Proceedings of the 2017 Conference on Empirical Methods in Natural Language Processing, Sep. 2017, 785-794.
Lan et al., "Mwptoolkit: An opensource framework for deep learning-based math word problem solvers" CoRR, Submitted on Sep. 2021, arXiv:2109.00799v1, 9 pages.
Lanchantin et al., "Neural message passing for multi-label classification" CoRR, Submitted on Apr. 2019, arXiv: 1904.08049v1, 19 pages.
Lattner et al., "MLIR: Scaling compiler infrastructure for domain specific computation" In 2021 IEEE/ACM International Symposium on Code Generation and Optimization, 2021, 13 pages.
Lee et al., "Deduplicating training data makes language models better" CoRR, Submitted on Jul. 2021, 2107.06499v1, 20 pages.
Lepikhin et al., "Gshard: Scaling giant models with conditional computation and automatic sharding" In International Conference on Learning Representations, Oct. 2020, 23 pages.
Levesque et al., "The Winograd Schema Challenge" In Thirteenth International Conference on the Principles of Knowledge Representation and Reasoning, 2012, 552-561.
Lewis et al., "Bart: Denoising sequence-to-sequence pre-training for natural language generation, translation, and comprehension" In Proceedings of the 58th Annual Meeting of the Association for Computational Linguistics, Jul. 2020, 7871- 7880.
Li et al., "Competition-level code generation with alphacode" CoRR, Submitted on Feb. 2022, arXiv:2203.07814v1, 74 pages.
Li et al., "Pytorch distributed: Experiences on accelerating data parallel training" CoRR, Submitted on Jun. 2020, arXiv:2006.15704v1, 14 pages.
Li et al., "The NiuTrans machine translation systems for WMT19" In Proceedings of the Fourth Conference on Machine Translation (vol. 2: Shared Task Papers, Day 1), Aug. 2019, 257-266.
Lieber et al., "Jurassic-I: Technical details and evaluation" White Paper AI21 Labs, 2021, 9 pages.
Lim et al., "Zico: Efficient GPU memory sharing for concurrent DNN training" In 2021 USENIX Annual Technical Conference (USENIX ATC). USENIX Association, Jul. 2021, 523-536.
Lin et al., "Pre-training multilingual neural machine translation by leveraging alignment information" In Proceedings of the 2020 Conference on Empirical Methods in Natural Language Processing (EMNLP ), Nov. 2020, 2649-2663.
Lin, "Rouge: A package for automatic evaluation of summaries" In Text Summarization Branches Out, Jul. 2004, 8 pages.
Ling et al., "Program induction by rationale generation: Learning to solve and explain algebraic word problems" In Proceedings of the 55th Annual Meeting of the Association for Computational Linguistics (vol. 1: Long Papers), Jul. 2017, 158- 167.
Lopes et al., "DéjàVu: a map of code duplicates on GitHub." Proceedings of the ACM on Programming Languages 1.OOPSLA, Oct. 2017, 84:1-28.
Ma et al., "Modeling task relationships in multi-task learning with multi-gate mixture-of-experts" In Proceedings of the 24th ACM SIGKDD International Conference on Knowledge Discovery & Data Mining, Jul. 2018, 1930-1939.
Mahajan et al., "Themis: Fair and efficient GPU cluster scheduling" In 17th USENIX Symposium on Networked Systems Design and Implementation (NSDI), Feb. 2020, 289-304.
Mattson et al., "MLPerf: An industry standard benchmark suite for machine learning performance" IEEE Micro, 2020, 40(2):8-16.
McCandlish et al., "An empirical model of large-batch training" CoRR, Submitted on Dec. 2018, arXiv: 1812.06162v1, 35 pages.
Mihaylov et al., "Can a suit of armor conduct electricity? A new dataset for open book question answering" CoRR, Submitted on Sep. 2018, arXiv:1809.02789v1, 14 pages.
Mitchell et al., "Model cards for model reporting" CoRR, Submitted on Oct. 2018, arXiv: 1810.03993v1, 9 pages.
Moritz et al., "Ray: A distributed framework for emerging AI applications" In Proceedings of the 13th USENIX Conference on Operating Systems Design and Implementation (OSDI). USENIX Association, Oct. 2018, 561-577.
Mostafazadeh et al., "A corpus and cloze evaluation for deeper understanding of commonsense stories" In Proceedings of the 2016 Conference of the North American Chapter of the Association for Computational Linguistics: Human Language Technologies, Jun. 2016, 839-849.
Murray et al., "Naiad: A timely dataflow system" In Proceedings of the 24th ACM Symposium on Operating Systems Principles (SOSP). ACM, Nov. 2013, 439-455.
Narayan et al., "Don't give me the details, just the summary! Topic-aware convolutional neural networks for extreme summarization" In Proceedings of the 2018 Conference on Empirical Methods in Natural Language Processing, Oct. 2018, 1797-1807.
Narayanan et al., "Efficient large-scale language model training on gpu clusters using megatron-lm" In Proceedings of the International Conference for High Performance Computing, Networking, Storage and Analysis, Jul. 2021, 14 pages.
Narayanan et al., "Heterogeneity-aware cluster scheduling policies for deep learning workloads." In 14th USENIX Symposium on Operating Systems Design and Implementation (OSDI), Nov. 2020, 481-498.
Narayanan et al., "Memory-efficient pipeline-parallel dnn training" In International Conference on Machine Learning, Jul. 2021, 11 pages.
Narayanan et al., "PipeDream: Generalized pipeline parallelism for DNN training." Proceedings of the 27th ACM Symposium on Operating Systems Principles, Oct. 2019, 15 pages.
Naumov et al., "Deep learning training in Facebook data centers: Design of scale-up and scale-out systems" CoRR, Submitted on Mar. 2020, arXiv:2003.09518v1, 10 pages.
Nie et al., "Adversarial NLI: A new benchmark for natural language understanding" CoRR, Submitted on Oct. 2019, arXiv:1910.14599v1, 12 pages.
Novikova et al., "The E2E dataset: New challenges for end-to-end generation" In Proceedings of the 18th Annual SIGdial Meeting on Discourse and Dialogue, Aug. 2017, 201-206.
Ouyang et al., "Training language models to follow instructions with human feedback" CoRR, Submitted on Mar. 2022, arXiv:2203.02155v1, 68 pages.
Paperno et al., "The lambada dataset: Word prediction requiring a broad discourse context" CoRR, Submitted on Jun. 2016, arXiv: 1606.06031v1, 10 pages.
Pascanu et al., "Understanding the exploding gradient problem" CoRR, Submitted on Nov. 2012, arXiv: 1211.5063v1, 11 pages.

(56) References Cited

OTHER PUBLICATIONS

Paszke et al., "PyTorch: An imperative style, high-performance deep learning library" In Advances in Neural Information Processing Systems, vol. 32, 2019, 12 pages.
Patel et al., "Are NLP models really able to solve simple math word problems?" In Proceedings of the 2021 Conference of the North American Chapter of the Association for Computational Linguistics: Human Language Technologies, Jun. 2021, 2080-2094.
Patterson et al., "Carbon Emissions and large neural network training" CoRR, Submitted on Apr. 2021, arXiv:2104.10350v1, 22 pages.
Pham et al., "Efficient neural architecture search via parameters sharing" In International Conference on Machine Learning. PMLR, 2018, 10 pages.
Pi et al., "Reasoning like program executors" CoRR, Submitted on Jan. 2022, arXiv:2201.11473v1, 17 pages.
Piekos et al., "Measuring and improving BERT's mathematical abilities by predicting the order of reasoning" In Proceedings of the 59th Annual Meeting of the Association for Computational Linguistics and the 11th International Joint Conference on Natural Language Processing (vol. 2: Short Papers), Aug. 2021, 383-394.
Pu et al., "Learning compact metrics for MT" In Proceedings of the 2021 Conference on Empirical Methods in Natural Language Processing, Nov. 2021, 751-762.
Radford et al., "Improving language understanding by generative pre-training" 2018, 12 pages.
Rae et al., "Scaling language models: Methods, analysis & insights from training gopher" CoRR, Submitted on Dec. 2021, arXiv:2112.11446v1, 118 pages.
Raffel et al., "Exploring the limits of transfer learning with unified text to text transformer" CoRR, Submitted on Oct. 2019, arXiv:1910.10683v1, 52 pages.
Rajbhandari et al., "Zero: Memory optimizations toward training trillion parameter models" CoRR, Submitted on Oct. 2019, arXiv:1910.02054v2, 17 pages.
Rajbhandari et al., "Zero-infinity: Breaking the gpu memory wall for extreme scale deep learning" CoRR, Submitted on Apr. 2021, arXiv:2104.07857v1, 14 pages.
Raji et al., "AI and the everything in the whole wide world benchmark" CoRR, Submitted on Nov. 2021, arXiv:2111.15366v1, 20 pages.
Rajpurkar et al., "Know what you don't know: Unanswerable questions for Squad" In Proceedings of the 56th Annual Meeting of the Association for Computational Linguistics (vol. 2: Short Papers), Jul. 2018, 784-789.
Rasley et al., "Deepspeed: System optimizations enable training deep learning models with over 100 billion parameters" In Proceedings of the 26th ACM SIGKDD International Conference on Knowledge Discovery & Data Mining, Aug. 2020, 3505-3506.
Reddy et al., "Coqa: A conversational question answering challenge" CoRR, Submitted on Aug. 2018, arXiv:1808.07042v1, 16 pages.
Ren et al., "Hopper: Decentralized speculation-aware cluster scheduling at scale" In Proceedings of the 2015 ACM Conference on Special Interest Group on Data Communication, Aug. 2015, 379-392.
Ren et al., "Zero-Offload: Democratizing Billion-Scale model training" In the Proceedings of the 2021 USENIX Annual Technical Conference, Jul. 2021, 551-564.
Reynolds et al., "Prompt Programming for Large Language Models: Beyond the Few- Shot Paradigm" CoRR, Submitted on Feb. 2021, arXiv:2102.07350v1, 10 pages.
Rhu et al., "vDNN: Virtualized deep neural networks for scalable, memory-efficient neural network design" In 2016 49th Annual IEEE/ACM International Symposium on Microarchitecture (Micro), IEEE, 2016, 13 pages.
Roberts et al., "Scaling up models and data with t5x and seqio" CoRR, Submitted on Mar. 2022, arXiv:2203.17189v1, 12 pages.
Rottger et al., "HateCheck: Functional tests for hate speech detection models" In Proceedings of the 59th Annual Meeting of the Association for Computational Linguistics and the 11th International Joint Conference on Natural Language Processing (vol. 1: Long Papers), Aug. 2021, 41-58.
Roy et al., "Efficient content-based sparse attention with routing transformers" CoRR, Submitted on Mar. 2020, arXiv:2003.05997v1, 11 pages.
Rudinger et al., "Gender bias in coreference resolution" In Proceedings of the 2018 Conference of the North American Chapter of the Association for Computational Linguistics: Human Language Technologies, vol. 2 (Short Papers), Jun. 2018, 8- 14.
Sakaguchi et al., "WinoGrande: An adversarial winograd schema challenge at scale" CoRR, Submitted on Jul. 2019, arXiv: 1907310641v1, 11 pages.
Sambasivan et al. "Re-imagining algorithmic fairness in india and beyond" In Proceedings of the 2021 ACM Conference on Fairness, Accountability, and Transparency, FAccT '21, Mar. 2021, 315-328.
Sanh et al., "Multitask prompted training enables zero-shot task generalization" Proceedings of the International Conference on Learning Representations, 2021, 216 pages.
Sap et al., "The risk of racial bias in hate speech detection" In Proceedings of the 57th Annual Meeting of the Association for Computational Linguistics, Jul. 2019, 1668- 1678.
Scialom et al., "MLSUM: The multilingual summarization corpus" In Proceedings of the 2020 Conference on Empirical Methods in Natural Language Processing (EMNLP), Nov. 2020, 8051-8067.
Shahrad et al., "Availability knob: Flexible user-defined availability in the cloud." In Proceedings of the Seventh ACM Symposium on Cloud Computing, Oct. 2016, 15 pages.
Shallue et al., "Measuring the effects of data parallelism on neural network training" CoRR, Submitted on Nov. 2018, arXiv:1811.03600v1, 42 pages.
Shazeer "Fast transformer decoding: One write-head is all you need" CoRR, Submitted on Nov. 2019, arXiv:1911.02150v1, 9 pages.
Shazeer "GLU variants improve transformer" CoRR, Submitted on Feb. 2020, arXiv:2002.05202v1, 5 pages.
Shazeer et al., "Adafactor: Adaptive learning rates with sublinear memory cost" In International Conference on Machine Learning, Jul. 2018, 9 pages.
Shazeer et al., "Mesh-TensorFlow: Deep learning for supercomputers" In Advances in Neural Information Processing Systems, 2018, 10 pages.
Shazeer et al., Outrageously large neural networks: The sparsely-gated mixture-of- experts layer. In ICLR (Poster), 2017, 19 pages.
Sheng et al., "Societal biases in language generation: Progress and challenges" In Proceedings of the 59th Annual Meeting of the Association for Computational Linguistics and the 11th International Joint Conference on Natural Language Processing (vol. 1: Long Papers), 4275-4293.
Shoeybi et al., "Megatron-LM: Training multi-billion parameter language models using model parallelism" CoRR, Submitted on Sep. 2019, arXiv: 1909.08053v1, 15 pages.
Siddhant et al., "Evaluating the cross-lingual effectiveness of massively multilingual neural machine translation" In Proceedings of the AAAI conference on artificial intelligence, vol. 34, Apr. 2020, 8854-8861.
Singh et al., "Jupiter rising: A decade of clos topologies and centralized control in google's datacenter network" ACM SIGCOMM computer communication review, Oct. 2015, 45(4): 183-197.
Smith et al., "Don't Decay the Learning Rate, Increase the Batch Size." In International Conference on Learning Representations, Feb. 2018, 11 pages.
Smith et al., "Using deepspeed and megatron to train megatron-turing NLG 530B, a large-scale generative language model" CoRR, Submitted on Jan. 2022, arXiv:2201.11990v1, 44 pages.
Song et al., "Mass: Masked Sequence to Sequence Pre-training for Language Generation." International Conference on Machine Learning. PMLR, May 2019, 11 pages.
Stanovsky et al., "Evaluating gender bias in machine translation" In Proceedings of the 57th Annual Meeting of the Association for Computational Linguistics, Jul. 2019, 1679-1684.

(56) References Cited

OTHER PUBLICATIONS

Su et al., "Roformer: Enhanced transformer with rotary position embedding" CoRR, Submitted on Apr. 2021, arXiv:2104.09864v1, 12 pages.
Sue, "Chapter 2 : The Invisible Whiteness of Being: Whiteness, White Supremacy, White Privilege, and Racism." In Addressing racism: Facilitating cultural competence in mental health and educational settings, 2006, 15-30.
Sustainability.google [online], "Google Sustainability" Sep. 2018, retrieved on Nov. 17, 2023, retrieved from URL <https://sustainability.google>, 12 pages.
Talmor et al., "CommonsenseQA: A question answering challenge targeting commonsense knowledge" In Proceedings of the 2019 Conference of the North American Chapter of the Association for Computational Linguistics: Human Language Technologies, vol. 1 (Long and Short Papers), Jun. 2019, 4149-4158.
Tay et al., "Sparse sinkhorn attention" International Conference on Machine Learning. PMLR, Nov. 2020, 10 pages.
Tensorflow.org [online], "TensorFlow Datasets: A collection of ready-to-use datasets" Feb. 2019, retrieved on Nov. 22, 20223, retrieved from URL <https://www.tensorflow.org/datasets>, 2 pages.
Tensorflow.org [online], "XLA: Optimizing compiler for Tensor Flow" Sep. 2019, retrieved on Nov. 17, 2023, retrieved from URL <https://www.tensorflow.org/xla>, 2 pages.
Thoppilan et al., "Lamda: Language models for dialog applications" CoRR, Submitted on Jan. 2022, arXiv:2201.08239v1, 47 pages.
Toral et al., "Neural machine translation for English-Kazakh with morphological segmentation and synthetic data" In Proceedings of the Fourth Conference on Machine Translation (vol. 2: Shared Task Papers, Day 1), Aug. 2019, 386-392.
Vaswani et al., "Attention is all you need" CoRR, Submitted on Jun. 2017, arXiv:1706.03762v1, 15 pages.
Vijaykumar et al., "Zorua: A holistic approach to resource virtualization in GPUs" In 2016 49th Annual IEEE/ACM International Symposium on Microarchitecture (Micro). IEEE, Oct. 2016, 14 pages.
Wang et al., "Multi-agent dual learning" In Proceedings of the International Conference on Learning Representations (ICLR), Sep. 2019, 15 pages.
Wang et al., "Self-consistency improves chain of thought reasoning in language models" CoRR, Submitted on Mar. 2022, arXiv:2203.11171v1, 15 pages.
Wang et al., "Superglue: A stickier benchmark for general-purpose language understanding systems." Advances in neural information processing systems 32, 2019, 15 pages.
Wang et al., "Wavelet: Efficient DNN training with Tick-Tock scheduling" In Proceedings of Machine Learning and Systems, Mar. 2021, 15 pages.
Webson et al., "Do prompt-based models really understand the meaning of their prompts?" CoRR, Submitted on Sep. 2021, arXiv:2109.01247v1, 23 pages.
Webster et al., "Scalable cross lingual pivots to model pronoun gender for translation" CoRR, Submitted on Jun. 2020, arXiv:2006.08881v1, 11 pages.
Wei et al., "Chain of thought prompting elicits reasoning in large language models" CoRR, Submitted on Jan. 2022, arXiv:2201.11903v1, 24 pages.
Wei et al., "Finetuned language models are zero-shot learners" In International Conference on Learning Representations, 2022, 46 pages.
Weidinger et al., "Ethical and social risks of harm from language models" CoRR, Submitted on Dec. 2021, arXiv:2112.04359v1, 64 pages.
Welbl et al., "Challenges in detoxifying language models" In Findings of the Association for Computational Linguistics: EMNLP 2021, Nov. 2021, 2447- 2469.
Weng et al., "MLaaS in the wild: Workload analysis and scheduling in large-scale heterogeneous GPU clusters" In 19th USENIX Symposium on Networked Systems Design and Implementation (NSDI), Apr. 2022, 945-960.
Wentzlaff et al., "An operating system for multicore and clouds: Mechanisms and implementation" In Proceedings of the 1st ACM symposium on Cloud computing, Jun. 2010, 12 pages.
Xia et al., "Microsoft Research Asia's systems for WMT19" In Proceedings of the Fourth Conference on Machine Translation (vol. 2: Shared Task Papers, Day 1), Aug. 2019, 424-433.
Xiao et al., "Antman: Dynamic scaling on GPU clusters for deep learning" In 14th USENIX Symposium on Operating Systems Design and Implementation (OSDI). Usenix Association, Nov. 2020, 533-548.
Xiao et al., "Gandiva: Introspective cluster scheduling for deep learning" In 13th USENIX Symposium on Operating Systems Design and Implementation (OSDI), Oct. 2018, 595-610.
Xu et al., "GSPMD: general and scalable parallelization for ml computation graphs" CoRR, Submitted on May 2021, arXiv:2105.04663v1, 16 pages.
Xue et al., "Byt5: Towards a token-free future with pre-trained byte-to-byte models" CoRR, Submitted on May 2021, arXiv:2105.13626v1, 17 pages.
Xue et al., "mt5: A massively multilingual pre-trained text-to-text transformer" In Proceedings of the 2021 Conference of the North American Chapter of the Association for Computational Linguistics: Human Language Technologies, Jun. 2021, 483-498.
Yang et al., "Pipemare: Asynchronous pipeline parallel DNN training" CoRR, Submitted on Oct. 2019, arXiv: 1910.05124v1, 42 pages.
Yasunaga et al., "Break-it-fix-it: Unsupervised learning for program repair" In Proceedings of the 38th International Conference on Machine Learning, ICML 2021, Jul. 2021, 12 pages.
Yasunaga et al., "Graph-based, self-supervised program repair from diagnostic feedback." International Conference on Machine Learning. PMLR, Nov. 2020, 10 pages.
You et al., "Large batch training of convolutional networks" CoRR, Submitted on Sep. 2017, arXiv: 1708.03888v3, 8 pages.
Yu et al., "AvA: Accelerated virtualization of accelerators" In Proceedings of the Twenty-Fifth International Conference on Architectural Support for Programming Languages and Operating Systems, Mar. 2020, 807-825.
Yu et al., Dynamic control flow in large-scale machine learning. In Proceedings of EuroSys 2018, Apr. 2018, 15 pages.
Yu et al., "Salus: Fine-grained GPU sharing primitives for deep learning applications" CoRR, Submitted on Feb. 2019, 15 pages.
Zaheer et al., "Big bird: Transformers for longer sequences" Advances in Neural Information Processing Systems, 2020, 15 pages.
Zellers et al., "Hellaswag: Can a machine really finish your sentence?" CoRR, Submitted on May 2019, arXiv: 1905.07830v1, 14 pages.
Zeng et al., "PanGu-a: Large-scale Autoregressive Pretrained Chinese Language Models with Auto-parallel Computation" CoRR, Submitted on Apr. 2021, arXiv:2104.12369v1, 23 pages.
Zhang et al., "Share or not? learning to schedule language-specific capacity for multilingual translation" In International Conference on Learning Representations, 2021, 19 pages.
Zhao et al., "Recommending what video to watch next: A multitask ranking system" In Proceedings of the 13th ACM Conference on Recommender Systems, Sep. 2019, 43-51.
Zhao et al., "vPipe: A virtualized acceleration system for achieving efficient and scalable pipeline parallel DNN training" IEEE Transactions on Parallel and Distributed Systems, 33(3), Jul. 2022, 489-506.
Zoph et al., "Designing effective sparse expert models" CoRR, Submitted on Feb. 2022, arXiv:2202.08906v1, 38 pages.

\* cited by examiner

ATTENTION NEURAL NETWORKS WITH PARALLEL ATTENTION AND FEED-FORWARD LAYERS

CROSS-REFERENCE TO RELATED APPLICATION

This application claims priority to U.S. Provisional Application No. 63/326,764, filed on Apr. 1, 2022. The disclosure of the prior application is considered part of and is incorporated by reference in the disclosure of this application.

BACKGROUND

This specification relates to performing a machine learning task on a network input using neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes a system implemented as computer programs on one or more computers in one or more locations that performs a machine learning task on a network input using an attention neural network that includes a parallel attention layer. The parallel attention layer includes an attention sub-layer arranged in parallel with a feed-forward sub-layer.

Particular embodiments of the subject matter described in this specification can be implemented so as to realize one or more of the following advantages.

The techniques described in this specification allow an attention neural network system to process input sequences, generate output sequences, or both with greater model throughput than existing attention-based neural networks by using a new, parallel configuration of the attention layer, in which the feed-forward layer and the attention layer are arranged in parallel, i.e. rather than stacked atop one another, as in existing attention-based neural networks. In some examples, the attention neural network can process 40 percent more fixed-length input sequences than a conventional attention-based neural network per second. This parallel configuration also makes an attention-based neural network more suitable for deployment on modern parallel computing hardware, including hardware accelerator devices that perform matrix multiplications using dedicated circuitries.

Additionally, in some examples, this parallel configuration can lead to on par or even better performance, e.g., better perplexities or other accuracy measures of output quality such as F-1 scores, on a variety of machine learning tasks relative to existing attention-based neural networks, including those which were previously thought to be state-of-the-art. In particular, the parallel configuration reduces the overall depth of an attention neural network that has a comparable number of model parameters in a way that improves rather than degrades the performance of the attention neural network as had been found when conventional attention layer configuration has been employed.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
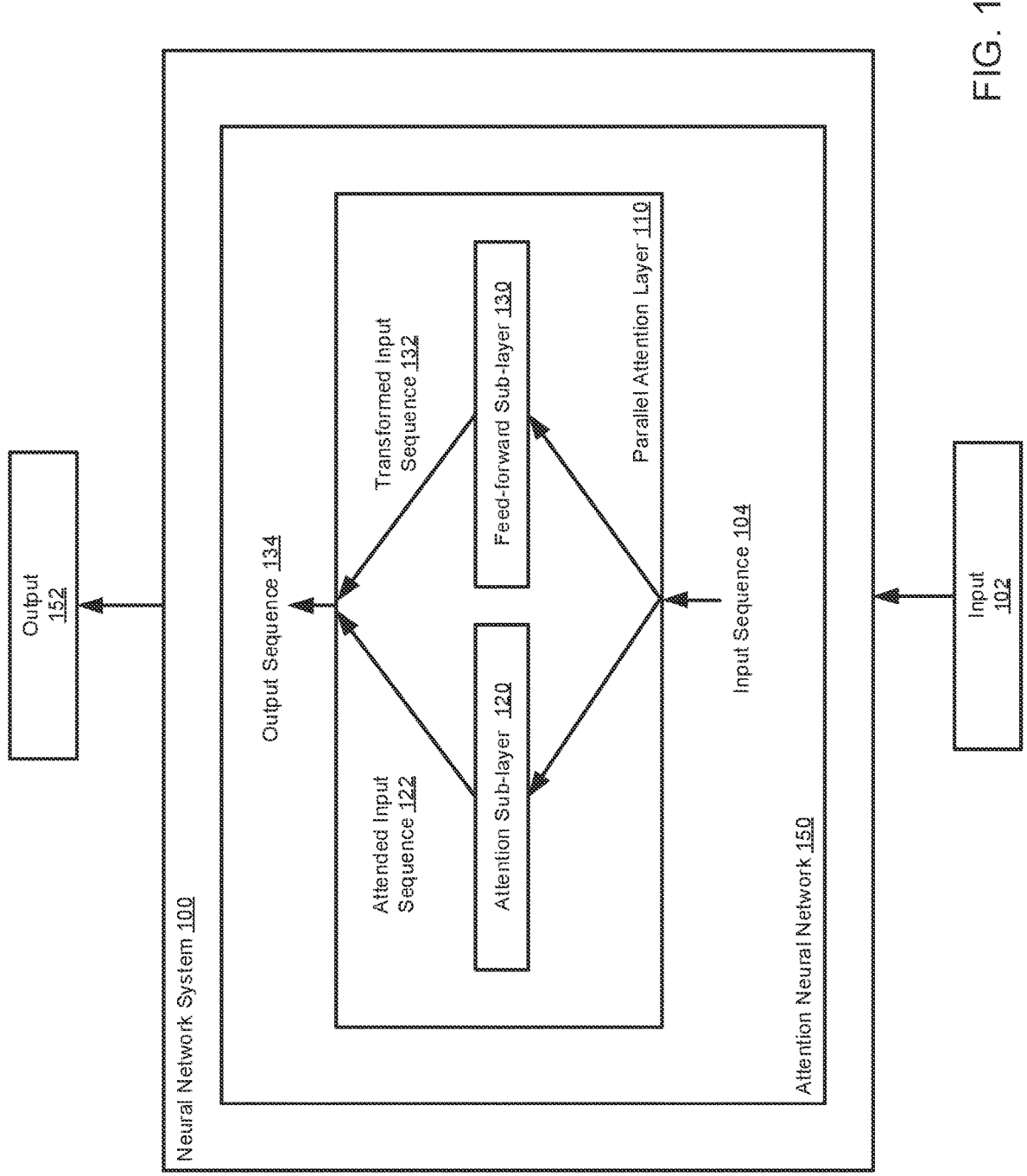
FIG. 1 shows an example neural network system.

FIG. 1 shows an example neural network system 100. The neural network system 100 is an example of a system implemented as computer programs on one or more computers in one or more locations, in which the systems, components, and techniques described below can be implemented.

The neural network system 100 can receive an input 102 and perform a machine learning task on the input 102 to generate an output 152.

The machine learning task can be any machine learning task that involves (i) operating on an input 102 that is an input sequence, (ii) generating an output 152 that is an output sequence, or (iii) both.

Some examples of machine learning tasks that the system can be configured to perform follow.

As one example, the task may be a neural machine translation task. For example, if the input to the neural network is a sequence of text, e.g., a sequence of words, phrases, characters, or word pieces, in one language, the output generated by the neural network may be a translation of the sequence of text into another language, i.e., a sequence of text in the other language that is a translation of the input sequence of text. As a particular example, the task may be a multi-lingual machine translation task, where a single neural network is configured to translate between multiple different source language—target language pairs. In this example, the source language text may be augmented with an identifier that indicates the target language into which the neural network should translate the source language text.

As another example, the task may be an audio processing task. For example, if the input to the neural network is a sequence representing a spoken utterance, the output generated by the neural network may be a score for each of a set of pieces of text, each score representing an estimated likelihood that the piece of text is the correct transcript for the utterance. As another example, if the input to the neural network is a sequence representing a spoken utterance, the output generated by the neural network can indicate whether a particular word or phrase ("hotword") was spoken in the utterance. As another example, if the input to the neural network is a sequence representing a spoken utterance, the output generated by the neural network can identify the natural language in which the utterance was spoken.

As another example, the task can be a natural language processing or understanding task, e.g., an entailment task, a paraphrase task, a textual similarity task, a sentiment task, a sentence completion task, a grammaticality task, and so on, that operates on a sequence of text in some natural language.

As another example, the task can be a text to speech task, where the input is text in a natural language or features of text in a natural language and the network output is a spectrogram, a waveform, or other data defining audio of the text being spoken in the natural language.

As another example, the task can be a health prediction task, where the input is a sequence derived from electronic health record data for a patient and the output is a prediction that is relevant to the future health of the patient, e.g., a predicted treatment that should be prescribed to the patient, the likelihood that an adverse health event will occur to the patient, or a predicted diagnosis for the patient.

As another example, the task can be a text generation task, where the input is a sequence of text, and the output is another sequence of text, e.g., a completion of the input sequence of text, a response to a question posed in the input sequence, or a sequence of text that is about a topic specified by the first sequence of text. As another example, the input to the text generation task can be an input other than text, e.g., an image, and the output sequence can be text that describes the input.

As another example, the task can be an image generation task, where the input is a conditioning input and the output is a sequence of intensity value inputs for the pixels of an image.

As another example, the task can be an agent control task, where the input is a sequence of observations or other data characterizing states of an environment and the output defines an action to be performed by the agent in response to the most recent data in the sequence. The agent can be, e.g., a real-world or simulated robot, a control system for an industrial facility, or a control system that controls a different kind of agent.

As another example, the task can be a genomics task, where the input is a sequence representing a fragment of a DNA sequence or other molecule sequence and the output is either an embedding of the fragment for use in a downstream task, e.g., by making use of an unsupervised learning technique on a data set of DNA sequence fragments, or an output for the downstream task. Examples of downstream tasks include promoter site prediction, methylation analysis, predicting functional effects of non-coding variants, and so on.

In some cases, the machine learning task is a combination of multiple individual machine learning tasks, i.e., the system is configured to perform multiple different individual machine learning tasks, e.g., two or more of the machine learning tasks mentioned above. For example, the system can be configured to perform multiple individual natural language understanding tasks, with the network input including an identifier for the individual natural language understanding task to be performed on the network input.

To perform the machine learning task, the neural network system 100 includes an attention neural network 150 that includes multiple parallel attention layers 110. Each parallel attention layer 110 operates on an input sequence 104 and generates a corresponding output sequence 134.

Although one parallel attention layer is depicted in FIG. 1 for convenience, the attention neural network 150 generally includes other components or layers, including, for example, embedding layers, output layer, and other parallel attention layers.

As a particular example, in some implementations where the input 102 is an input sequence that has a sequence of network inputs arranged according to an input order, these other components can include a tokenizer which applies tokenization to the input 102. Tokenization refers to the process of segmenting a sequence of characters into semantically independent elements called tokens. For example, the vocabulary of tokens can be a vocabulary that is specified in the request or another default vocabulary maintained by the training system 100. The vocabulary of tokens can include any of a variety of tokens that represent text symbols or other symbols. For example, the vocabulary of tokens can include one or more of characters, sub-words, words, punctuation marks, numbers, or other symbols that appear in a corpus of natural language text. The SentencePiece tokenizer, which is described in more detail in Kudo, T. and Richardson, J. SentencePiece: A simple and language independent subword tokenizer and detokenizer for neural text processing. In Proceedings of the 2018 Conference on Empirical Methods in Natural Language Processing: System Demonstrations, pp. 66-71, Brussels, Belgium, November 2018a. Association for Computational Linguistics. doi: 10.18653/v1/D18-2012, is an example of a suitable tokenizer in this example.

As another particular example, in these implementations, the attention neural network 150 can include a rotary positional embedding layer. The rotary positional embedding layer is configured to, for each network input in the input sequence, map the network input to a rotary positional embedding by using a rotation matrix with parameters $\Theta = \{\theta_i = 10000^{-2(i-1)/d}, i \in [1, 2, \ldots, d/2]\}$, where i is a dimension within the rotary positional embedding, and d is a dimensionality of the rotary positional embedding. Each rotary positional embedding is a numeric representation of the network input in an embedding space, e.g., a vector in the embedding space. The rotary positional embedding layer, when included, then provides the numeric representations of the network inputs to the next neural network layer in the attention neural network 150, e.g., to the first parallel attention layer 110 of the multiple parallel attention layers.

Specifically, the input sequence 104 has a respective input at each of one or more input positions in an input order and the output sequence 134 has a respective output at each of one or more output positions in an output order. That is, the input sequence 102 has one or more inputs arranged according to an input order and the output sequence 134 has one or more outputs arranged according to an output order.

In general, the input sequence 104 can be any intermediate sequential data generated by the attention neural network 150 when performing the machine learning task on the input 102. For example, the input sequence 104 can be embedded (i.e., numeric) representations of the system input 102 generated by an embedding layer. As another example, the input sequence 104 can be an output sequence generated by a preceding parallel attention layer or other layer in the attention neural network 150. As another example, when the neural network 150 generates the network output autoregressively, the input sequence 104 can be embedded representations of the currently generated network output as of the current time step.

To generate the output sequence 134 from the input sequence 104, each parallel attention layer 110 includes an attention sub-layer 120 and a feed-forward sub-layer 130. The attention sub-layer 120 receives the input sequence 104 for the layer and applies an attention mechanism on the input sequence 104 for the layer to generate an attended input sequence 122.

Generally, to apply the attention mechanism, the sub-layer 120 uses one or more attention heads. Each attention head generates a set of queries, a set of keys, and a set of values, and then applies any of a variety of variants of query-key-value (QKV) attention using the queries, keys, and values to generate an output. When there are multiple attention heads, the sub-layer 120 then combines the outputs of the multiple attention heads, e.g., by concatenating the outputs and, optionally, processing the concatenated outputs through a linear layer. Examples of QKV attention variants are described in Vaswani, et al, *Attention Is All You Need*, arXiv:1706.03762, Raffel, et al, *Exploring the Limits of Transfer Learning with a Unified Text-to-Text Transformer*, arXiv:1910.10683, Devlin et al, *BERT: Pre-training of Deep Bidirectional Transformers for Language Understanding*, arXiv:1810.04805, Dai, et al, *Transformer-XL: Attentive Language Models Beyond a Fixed-Length Context*, arXiv:1901.02860, and Kitaev, et al, *Reformer: The Efficient Transformer*, arXiv: 2001.04451, the entire contents of which are hereby incorporated by reference herein in their entirety.

In some cases, the attended input sequence 122 is the final output of the attention mechanism. In some other cases, the attention sub-layer 120 applies one or more other operations, e.g., residual connections, layer normalization, or both, to the final output to generate the sequence 122.

The attention mechanism applied by the attention sub-layer 120 depends on the configuration of the attention neural network.

As one example, when the network input 102 is an input sequence, the attention neural network 150 can include an encoder neural network that includes a subset of the plurality of layers and that encodes the input sequence to generate a respective encoded representation of each input in the sequence. In this example, the attention mechanism applied by the attention sub-layers 120 within some or all of the parallel attention layers 110 of the encoder is a self-attention mechanism, e.g., a multi-head self-attention mechanism, where the queries, keys, and values are all generated from the input sequence to the attention sub-layer.

As another example, the attention neural network 150 includes a decoder neural network that includes a different subset of the plurality of layers and that processes either the network input or the encoded representation of the network input to generate the network output. In some of these examples, when the network output is an output sequence, the decoder neural network operates auto-regressively and the attention sub-layers 120 within some or all of the parallel attention layers 110 of the decoder apply masked self-attention over the partially generated output sequence, where the queries, keys, and values are all generated from the input sequence to the attention sub-layer 120.

When the neural network includes both an encoder and a decoder, the attention sub-layers 120 within some of the parallel attention layers in the decoder apply cross-attention into the encoded representations while others apply self-attention over the output sequence, either masked or not masked. In cross-attention, the queries are generated from the input sequence to the attention sub-layer 120 while the keys and values are generated from the encoded representations of the network input.

When the attention neural network 150 includes a decoder neural network that operates directly on the input sequence, i.e., includes only a decoder and not an encoder, the attention sub-layers within some or all of the parallel attention layers within the decoder can apply a self-attention mechanism over the input sequence.

In conventional attention neural networks, the feed-forward sub-layer 130 then operates on the attended input sequence 122 to generate an output sequence 134 for the layer 110.

In the described attention neural network 150, however, the feed-forward sub-layer 130 within each parallel attention layer 110 of the attention neural network is arranged in parallel with the attention sub-layer 120, e.g., instead of being stacked atop the attention sub-layer and configured to operate on the attended input sequence to generate an output sequence for the attention layer. Hence, the layer 110 is called "parallel attention layer." The specific choice of arranging the feed-forward sub-layer and attention sub-layer in parallel supports parallel processing when the attention neural network is implemented on one or more computers.

In particular, in this parallel configuration and unlike in conventional configurations, the attention sub-layer 120 and the feed-forward sub-layer 130 are configured to receive the same input sequence 104 for the parallel attention layer 110. Instead of operating on the attended input sequence 233 that is generated by the attention sub-layer 120, the feed-forward sub-layer operates on, e.g., applies a sequence of transformations to, the input sequence 104 for the parallel attention layer 110 to generate a transformed input sequence 132, which is then combined, e.g., summed, with the attended input sequence 122 generated by the attention sub-layer 120 to form the output sequence 134 for the parallel attention layer 110.

The attention neural network 150 can provide the output sequence 134 as input to the next parallel attention layer or other components of the attention neural network for further processing. If the parallel attention layer 110 is the final parallel attention layer in the attention neural network 150, the attention neural network 150 can provide the output sequence 134 to one or more output layers of the attention neural network that are configured to map the output sequence 134 to the output 152 of the neural network system 110.

In some implementations where the output 152 is an output sequence, the one or more output layers can include a linear layer followed by a softmax layer. The linear layer applies a learned linear transformation to the output sequence 134 of the last parallel attention layer 110 in order to project the output of the last parallel attention layer 110 into the appropriate space for processing by the softmax layer. The softmax layer then applies a softmax function over the outputs of the linear layer to generate, at each of multiple generation time steps, a probability distribution over a possible set of network outputs, which can be used to select a network output in the output sequence, e.g., by sampling from the probability distribution or by selecting the network output with the highest probability.

Figure 2:
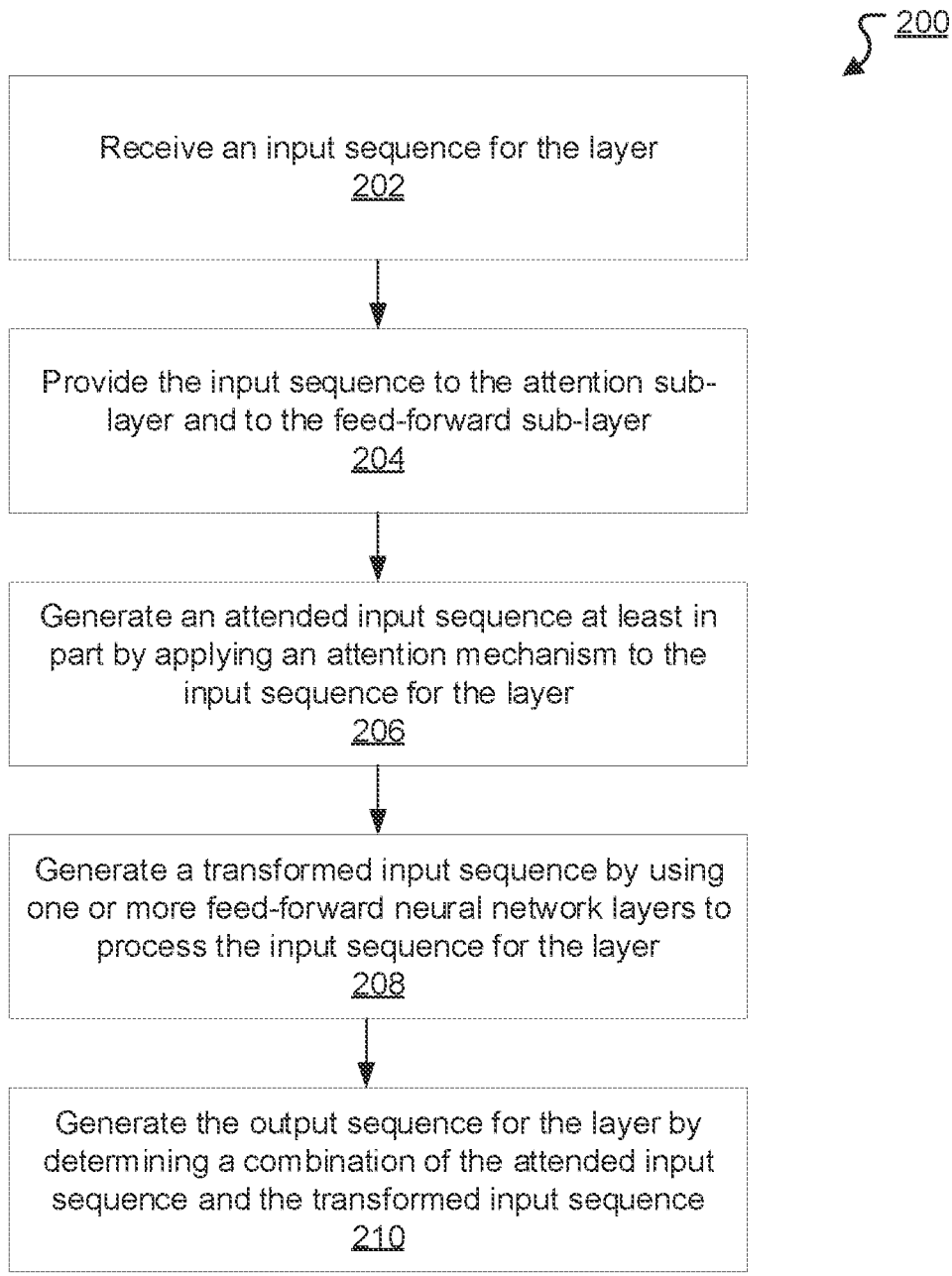
FIG. 2 is a flow diagram of an example process for generating an output sequence for an attention layer from an input sequence.

FIG. 2 is a flow diagram of an example process 200 for generating an output sequence for an attention layer from an input sequence. For convenience, the process 200 will be described as being performed by a system of one or more computers located in one or more locations. For example, a neural network system, e.g., neural network system 100 of FIG. 1, appropriately programmed in accordance with this specification, can perform the process 200.

In general, the system includes an attention neural network configured to perform a machine learning task. The attention neural network includes a plurality of attention layers. Each attention layer includes an attention sub-layer and a feed-forward sub-layer.

The system receives, at an attention layer, an input sequence for the layer (step 202). The input sequence includes a respective layer input at each of a plurality of input positions. In some implementations, the input sequence can be derived from an output of a previous attention layer of the attention neural network. In some other implementations, the input sequence can be derived from an input of the attention neural network.

The system provides the input sequence for the layer to the attention sub-layer and to the feed-forward sub-layer (step 204). The attention sub-layer and the feed-forward sub-layer are both included in the same attention layer. Within this attention layer, the attention sub-layer is arranged in parallel with the feed-forward sub-layer.

The system receives, at the attention sub-layer of the attention layer, the input sequence for the layer and then generates, by the attention sub-layer, an attended input sequence that includes a respective attended layer input for each of a plurality of output positions in an output sequence for the layer (step 206), at least in part by applying an attention mechanism to the input sequence for the layer. Applying the attention mechanism will be described further below with reference to FIG. 3.

The system receives, at the feed-forward sub-layer of the attention layer, the input sequence for the layer and then generates, by the feed-forward sub-layer, a transformed input sequence that includes a respective transformed layer input for each of the plurality of output positions in the output sequence for the layer (step 208). In general, the system can do this by using one or more feed-forward neural network layers included in the feed-forward sub-layer to process the input sequence for the layer or data derived from the input sequence for the layer by applying a sequence of transformations. Specifically, in some implementations, the feed-forward sub-layer directly operates on the input sequence while in other implementations, the feed-forward sub-layer first applies one or more other operations, e.g., layer normalization, to the input sequence and then processes the layer normalized input sequence using the one or more feed-forward neural network layers.

In some implementations, each feed-forward sub-layer can be configured to operate on each input position in the input sequence separately, i.e., in a position-wise manner. In these implementations, the transformations applied by a given feed-forward sub-layer will generally be the same for each input position (but different feed-forward sub-layers in the attention neural network will apply different transformations). The feed-forward sub-layer can perform these transformations independently and in parallel with each other on each input position.

In some implementations, the one or more feed-forward neural network layers included in the feed-forward sub-layer include two or more fully-connected layers separated by one or more non-linear activation layers, e.g., a ReLU activation layer, a squared ReLU activation layer, a Swish activation layer, or a SwiGLU activation layer. In these implementations, the sequence of transformations include a first linear transformation applied to the input sequence for the layer, followed by an activation function, e.g., a non-linear elementwise activation function, e.g., a ReLU activation function, a squared ReLU activation function, a Swish activation function, or a SwiGLU activation function, and then followed by a second linear transformation.

As a particular example, a SwiGLU activation function may be defined as:

$$\text{SwiGLU}(x, W, V, \beta) = \text{Swish}_\beta(xW) \otimes (xV),$$

where x represents the input sequence for the layer, W and V represents the weights of the two fully-connected layers, respectively, and $\text{Swish}_\beta(x) = x\text{sigmoid}(\beta x)$, with $\beta$ may either be a pre-defined constant value or a trainable parameter of the attention neural network.

In some of these implementations, no biases are used in the fully-connected layers; for example, to compute the first linear transformation applied to the input sequence, the first fully-connected layer in the two or more fully-connected layers multiplies the input sequence by a weight matrix to generate a product and, in particular, adds no bias to the product. The first fully-connected layer can use the same first weight matrix for all of the input positions in the input sequence.

The system generates, by the attention layer, the output sequence for the attention layer by determining a combination of the attended input sequence and the transformed input sequence (step 210). The system can generate this combination in any appropriate way. In some implementations, the system can determine the combination of the attended input sequence and the transformed input sequence by, for each of the plurality of output positions in the output sequence for the layer, computing a sum of the respective attended layer input and the respective transformed layer input for the output position. In some other implementations, the system can determine the combination by computing a weighted or unweighted average between the respective attended layer inputs and the respective transformed layer inputs for the plurality of output positions, or by concatenating the attended input sequence to the transformed input sequence.

Because the processing of the input sequence by the attention sub-layer and the feed-forward sub-layer can be parallelized, generating output sequences for each attention layer in this way is faster than in conventional attention neural network architectures, where an input sequence is first processed by an attention sub-layer to generate an attended input sequence which is subsequently processed by a feed-forward sub-layer to generate an output sequence. Model throughput can thus be improved.

Figure 3:
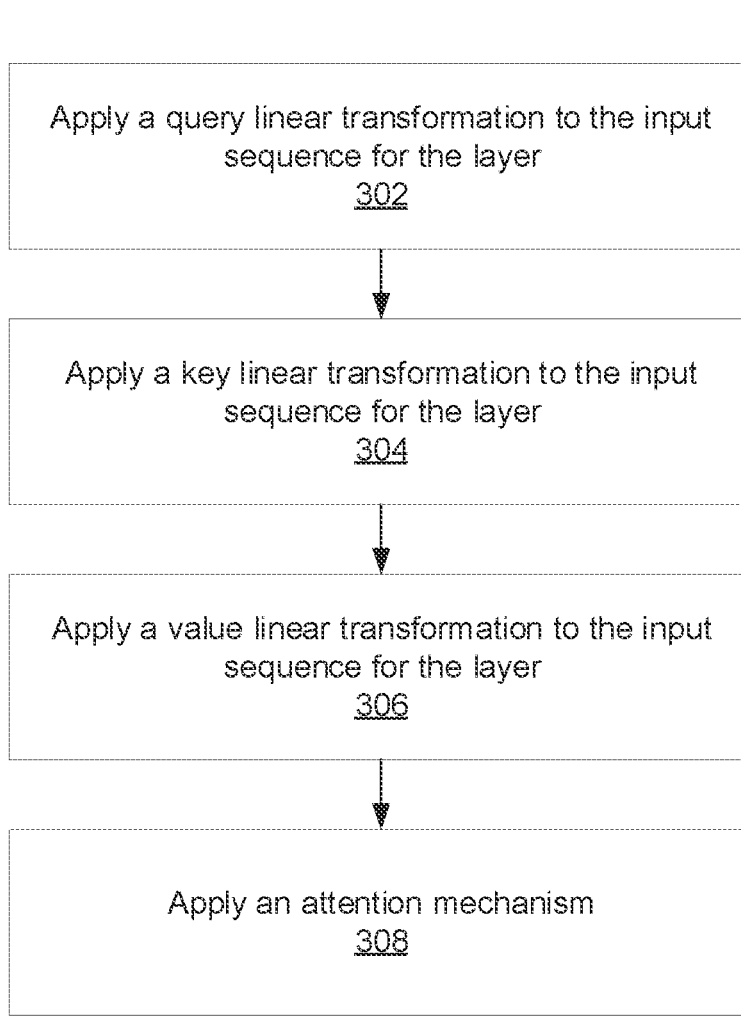
FIG. 3 is a flow diagram of an example process for generating an attended input sequence from an input sequence.

FIG. 3 is a flow diagram of an example process 300 for generating an attended input sequence from an input sequence. For convenience, the process 300 will be described as being performed by a system of one or more computers located in one or more locations. For example, a neural network system, e.g., neural network system 100 of FIG. 1, appropriately programmed in accordance with this specification, can perform the process 300.

As described above, the system receives an input sequence at the attention sub-layer included in the attention layer. The input sequence includes a respective layer input at each of a plurality of input positions.

Generally, to apply the attention mechanism, the attention sub-layer uses one or more attention heads. Each attention head generates a set of queries Q, a set of keys K, and a set of values V from the input sequence, and then applies a query-key-value (QKV) attention or one of its known variants using the queries, keys, and values to generate an output. Each query, key, or value can be in the form of a vector.

The system thus performs steps 302-308 at each attention head of the attention sub-layer for the input sequence to generate the attended input sequence. The attended input sequence includes a respective attended layer input for each of a plurality of output positions in an output sequence for the layer. When there are multiple attention heads, the system can perform these steps 302-308 at each attention head, e.g., in parallel with each other.

The system applies, by each attention head of the attention sub-layer, a query linear transformation to the input sequence for the layer or data derived from the input sequence to generate a query vector for the respective layer input at each of the plurality of input positions (step 302). Specifically, in multi-head attention, the data derived from the input sequence for the layer can include the original query vectors derived from the input sequence by the attention sub-layer. Each attention head is configured to receive the same original query vectors, but will generally learn different transformations from each other attention head to transform the original query vectors to generate an attention head-specific query vector for the respective layer input at each of the plurality of input positions.

Just as the feed-forward sub-layer, in some implementations, the attention sub-layer directly operates on the input sequence while in other implementations, the attention sub-layer first applies one or more other operations, e.g., layer normalization, to the input sequence and then operates on the layer normalized input sequence.

In some implementations, in addition to the query linear transformation, the system applies, by the attention head of the attention sub-layer, a first depth-wise convolution function to the plurality of query vectors to generate a plurality of modified query vectors.

The system applies, by the attention head of the attention sub-layer, a key linear transformation to the input sequence for the layer or data derived from the input sequence for the layer to generate a key vector for the respective layer input at each of the plurality of input positions (step 304). In multi-head attention, the data derived from the input sequence for the layer can include the original key vectors derived from the input sequence by the attention sub-layer, and each attention head is configured to transform the original key vectors to generate attention head-specific key vectors. The attention head-specific key vectors can be the same or different across the multiple attention heads. In some implementations, the system similarly applies a second depth-wise convolution function to the plurality of key vectors to generate a plurality of modified key vectors.

The system applies, by the attention head of the attention sub-layer, a value linear transformation to the input sequence for the layer or data derived from the input sequence for the layer to generate a value vector for the respective layer input at each of the plurality of input positions (step 306). In multi-head attention, the data derived from the input sequence for the layer can include the original value vectors derived from the input sequence by the attention sub-layer, and each attention head is configured to transform the original value vectors to generate attention head-specific value vectors. The attention head-specific value vectors can be the same or different across the multiple attention heads.

In some implementations, the system similarly applies a third depth-wise convolution function to the plurality of value vectors to generate a plurality of modified value vectors. In these implementations, the first, second, third depth-wise convolution layers can each be a respective depth-wise 2-D convolution function having a convolution kernel of a limited size, e.g., size 3×1, where 3 is the width and 1 is the height.

The system applies, by the attention head of the attention sub-layer included the attention layer, the attention mechanism over the respective layer inputs in the input sequence using the plurality of query vectors, the plurality of key vectors, and the plurality of value vectors—or, in the implementations where the depth-wise convolution functions are additionally used to process these vectors, the plurality of modified query vectors, the plurality of modified key vectors, and the plurality of modified value vectors (step 308).

The system generates the attended input sequence from the output of the attention mechanism at each attention head. In multi-head attention, the system can do this by combining the initial outputs of the multiple attention heads, e.g., by concatenating the initial outputs and, optionally, processing the concatenated outputs through a linear layer.

As will be described further below with reference to FIG. 4, because the underlying matrix operations required for performing steps 206 and 208 of process 200 can be fused, i.e., by computing one single, fused matrix multiplication that represents the forward passes of data that is fed in parallel through the two sub-layers, this parallel configuration improves model throughput both during training and inference, e.g., in terms of the total number of fixed-length input sequences that can be processed (e.g., generated) by the neural network over a given time period, especially when the neural network is deployed on hardware accelerator devices that perform matrix multiplications using dedicated circuitries, e.g., ASICs, FPGAs, graphic processing units (GPUs), or tensor processing units (TPUs), and more particularly on distributed machine learning systems comprising multiple TPUs and/or GPUs.

Figure 4:
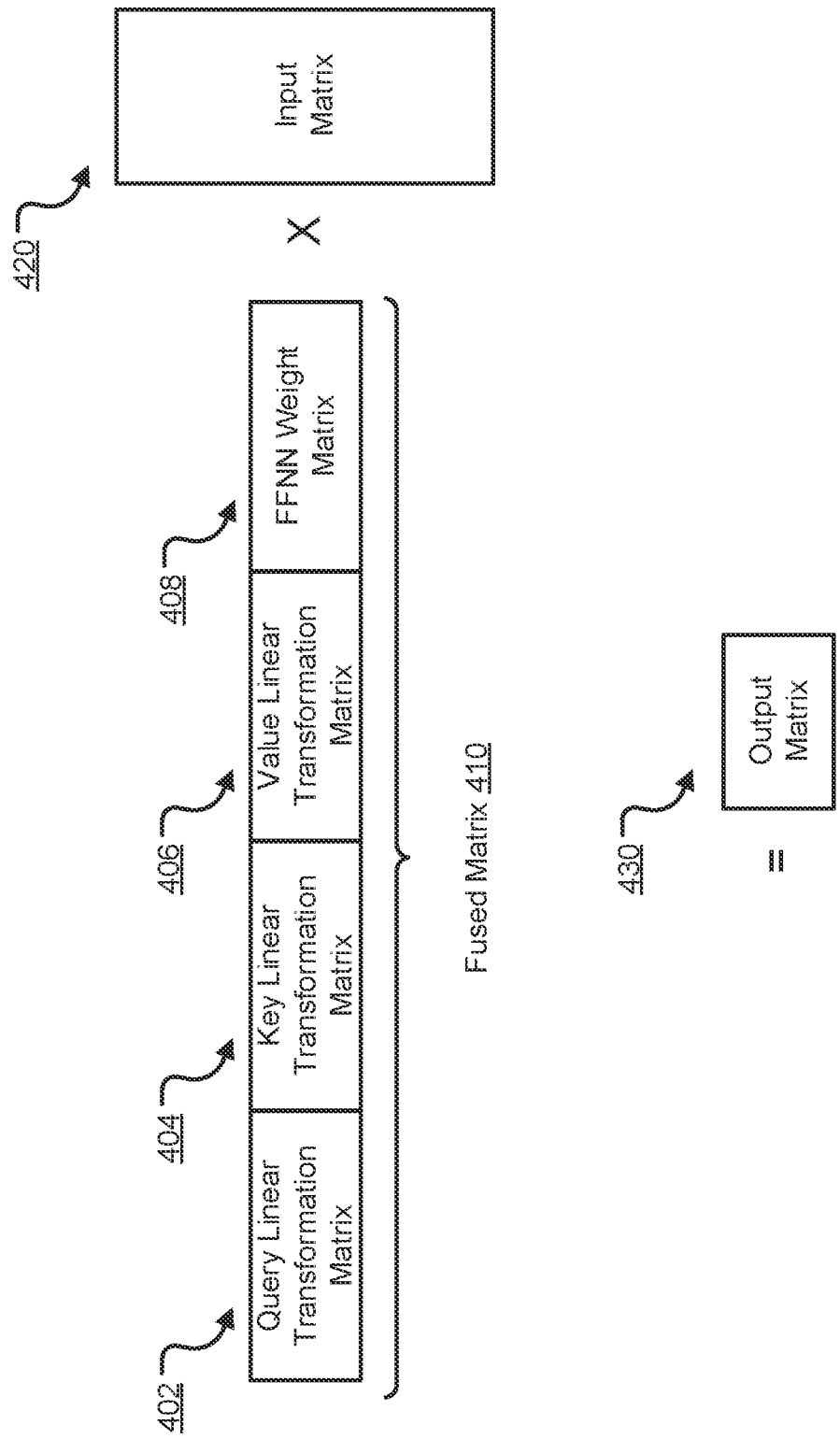
FIG. 4 shows an example of the matrix operations associated with an attention sub-layer and a feed-forward sub-layer of an attention layer.

FIG. 4 shows an example of the matrix operations associated with an attention sub-layer and a feed-forward sub-layer of an attention layer. For example, the attention sub-layer can be a parallel attention layer 110 of the neural network system 100 of FIG. 1, which in turn includes an attention sub-layer 120 and a feed-forward sub-layer 130.

The system obtains, for the attention sub-layer 120, a query linear transformation matrix 402 that defines the query linear transformation to be applied by the attention sub-layer 120 to the input sequence 104 for the parallel attention layer 110. For example, the query linear transformation matrix 402 can include, for each of the plurality of input positions of the input sequence 104, a set of learned numeric values, e.g., floating point or other type of numeric values, that can be multiplied with the respective layer input at the input position to generate the query vector. As used in this specification, the term "learned" means that an operation or a value has been adjusted during the training of the attention neural network 150.

The system obtains, for the attention sub-layer 120, a key linear transformation matrix 404 that defines the key linear transformation to be applied by the attention sub-layer 120 to the input sequence 104 for the parallel attention layer 110. For example, the key linear transformation matrix 404 can include, for each of the plurality of input positions of the input sequence 104, a set of learned numeric values, e.g., floating point or other type of numeric values, that can be multiplied with the respective layer input at the input position to generate the key vector.

The system obtains, for the attention sub-layer 120, a value linear transformation matrix 406 that defines the value linear transformation to be applied by the attention sub-layer 120 to the input sequence 104 for the parallel attention layer 110. For example, the value linear transformation matrix 406 can include, for each of the plurality of input positions of the input sequence 104, a set of learned numeric values, e.g., floating point or other type of numeric values, that can be multiplied with the respective layer input at the input position to generate the value vector.

The system obtains, for the feed-forward sub-layer 130, a weight matrix 408 that includes a set of learned numeric values that define corresponding weights of the one or more feed-forward neural network layers included in the feed-forward sub-layer 130.

The system generates, for the parallel attention layer 110, a fused matrix 410 from the query linear transformation matrix 402, the key linear transformation matrix 404, the value linear transformation matrix 406, and the weight matrix 408. For example, the system can generate this fused matrix by concatenating these matrices 402, 404, 406, and 408 along the row dimension.

The system performs, for the parallel attention layer 110, a matrix multiplication between the fused matrix 410 and an input matrix 420 that represents the input sequence 104 for the parallel attention layer 110 to generate an output matrix 430. The output matrix 430 generated in this way includes (i) values that define the query vectors, the key vectors, and the value vectors with which the attention sub-layer 120 can use in an attention mechanism to generate the attended input sequence 122, and (ii) values that define the transformed layer inputs included in the transformed input sequence 132.

For each attention layer in the attention neural network, the system can repeatedly perform the processes 200 and 300 to update the input sequence to the layer. When the attention layer is not the last layer in the attention neural network, the system can then provide the output sequence as the input to the subsequent neural network layer in the attention neural network, which can for example be another attention layer, or a layer normalization layer configured to apply layer normalization to the output sequence. By repeatedly performing the processes 200 and 300 for all of the attention layers in the attention neural network and then by processing at least part of the output sequence generated by the last attention layer in the attention neural network using one or more output layer(s), the system can generate a network output for a received network input.

That is, the processes 200 and 300 can be performed as part of predicting an output for an input for which the desired output, i.e., the output that should be generated by the system for the input sequence, is not known.

The processes 200 and 300 can also be performed as part of processing inputs derived from a set of training data, i.e., inputs derived from a set of inputs for which the output that should be generated by the system is known, in order to train the attention neural network to determine trained values for the parameters of the attention neural network. The system can repeatedly perform the processes 200 and 300 on inputs selected from a set of training data as part of a conventional machine learning training technique to train the attention layers and the other layers of the neural network, e.g., a gradient descent with backpropagation training technique that uses a conventional optimizer, e.g., stochastic gradient descent, RMSprop, or Adam optimizer, to optimize an objective function that is appropriate for the task that the attention neural network is configured to perform. During training, the system can incorporate any number of techniques to improve the speed, the effectiveness, or both of the training process. For example, the system can use dropout, label smoothing, or both to reduce overfitting. As another example, the system can perform the training using a distributed architecture that trains multiple instances of the attention neural network in parallel. Parallel training may occur with the technique of teacher forcing, where training is conditioned on known, ground truth outputs which at inference time is replaced by network predictions. Moreover, the system can first pre-train the neural network on a large unsupervised data set through unsupervised learning, e.g., to minimize a BERT loss or other unsupervised loss, and then fine-tune the neural network on task-specific training data to optimize the objective function for the task.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework or a JAX framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A system for performing a machine learning task on a network input to generate a network output, the system comprising one or more computers and one or more storage devices storing instructions that, when executed by the one or more computers, cause the one or more computers to implement:
an attention neural network configured to perform the machine learning task, the attention neural network comprising an attention layers, the attention layer comprising an attention sub-layer and a feed-forward sub-layer, and the attention layer configured to:
receive an input sequence for the attention layer comprising a respective layer input at each of a plurality of input positions;
provide the input sequence to the attention sub-layer and to the feed-forward sub-layer,
the attention sub-layer configured to generate an attended input sequence that includes a respective attended layer input for each of a plurality of output positions in an output sequence for the attention layer at least in part by applying an attention mechanism to the input sequence for the attention layer, and
the feed-forward sub-layer configured to generate a transformed input sequence that includes a respective transformed layer input for each of the plurality of output positions in the output sequence for the attention layer by using one or more feed-forward neural network layers included in the feed-forward sub-layer to process the input sequence for the attention layer, wherein the attention sub-layer and the feed-forward sub-layer are configured to operate in parallel with each other to generate the attended input sequence and the transformed input sequence, and wherein the operating in parallel comprises:
generating a fused matrix that includes a query linear transformation matrix associated with the attention sub-layer, a key linear transformation matrix associated with the attention sub-layer, a value linear transformation matrix associated with the attention sub-layer, and a weight matrix associated with the feed-forward sub-layer; and
performing a matrix multiplication between an input matrix representing the input sequence for the attention layer and the fused matrix to generate a matrix product representing the attended input sequence and the transformed input sequence; and
generate the output sequence for the attention layer by determining a combination of the attended input sequence and the transformed input sequence.

2. The system of claim 1, wherein determining the combination of the attended input sequence and the transformed input sequence comprises, for each of the plurality of output positions in the output sequence for the attention layer:
computing a sum of the respective attended layer input and the respective transformed layer input for the output position.

3. The system of claim 1, wherein the attention layer is further configured to provide the output sequence for the attention layer as input to a subsequent neural network layer in the attention neural network.

4. The system of claim 3, wherein the subsequent neural network layer comprises a layer normalization layer that is configured to apply layer normalization to the output sequence for the attention layer.

5. The system of claim 1, wherein the one or more feed-forward neural network layers included in the feed-forward sub-layer comprises two or more fully-connected layers separated by one or more non-linear activation layers.

6. The system of claim 5, wherein non-linear activation layers comprise a Swish activation layer.

7. The system of claim 1, wherein the network input comprises a sequence of network inputs arranged in an input order, and wherein the attention neural network further comprises an embedding layer configured to, for each network input in the sequence:
generate a rotary positional embedding of the network input by using a rotation matrix with parameters $\Theta=\{\theta_i=10000^{-2(i-1)/d}, i\in[1, 2, \ldots, d/2]\}$, where i is a dimension within the rotary positional embedding, and d is a dimensionality of the rotary positional embedding.

8. The system of claim 1, wherein the attention sub-layer is configured to apply the attention mechanism by:
applying a query linear transformation to the input sequence for the attention layer to generate a query vector for the respective layer input at each of the plurality of input positions,
applying a key linear transformation to the input sequence for the attention layer to generate a key vector for the respective layer input at each of the plurality of input positions, and
applying a value linear transformation to the input sequence for the attention layer to generate a value vector for the respective layer input at each of the plurality of input positions.

9. The system of claim 8, wherein the attention mechanism applied by the attention sub-layer comprises a multi-head attention mechanism, and wherein the attention sub-layer comprises a plurality of attention heads that are each configured to apply the multi-head attention mechanism by:
applying a corresponding query linear transformation to the query vectors generated by the attention sub-layer to generate an attention head-specific query vector for the respective layer input at each of the plurality of input positions.

10. The system of claim 9, wherein the attention sub-layer is configured to generating the attended input sequence by:
applying the multi-head attention mechanism by using the attention head-specific query vectors, head-specific key vectors, and attention head-specific value vectors to generate an initial output for each of the plurality of attention heads; and generating the attended input sequence by determining a combination of the initial output for each of the plurality of attention heads.

11. The system of claim 8, wherein the attention sub-layer is further configured to apply a depth-wise convolution function to the query vectors.

12. The system of claim 8, wherein generating the attended input sequence and the transformed input sequence comprises:
obtaining the query linear transformation matrix that represents the query linear transformation to the input sequence for the attention layer to generate the query vector for each respective layer input at each of the plurality of input positions;
obtaining the key linear transformation matrix that represents the key linear transformation to the input sequence for the attention layer to generate the key vector for each respective layer input at each of the plurality of input positions;
obtaining the value linear transformation matrix that represents the value linear transformation to the input sequence for the attention layer to generate the value vector for each respective layer input at each of the plurality of input positions; and
obtaining the weight matrix that represents corresponding weights of the one or more feed-forward neural network layers included in the feed-forward sub-layer.

13. One or more non-transitory computer storage media storing instructions that when executed by one or more computer cause the one or more computer to implement an attention neural network configured to perform a machine learning task on a network input to generate a network output, wherein the attention neural network comprise an attention layers, wherein the attention layer comprises an attention sub-layer and a feed-forward sub-layer, and wherein the attention layer is configured to:
receive an input sequence for the attention layer comprising a respective layer input at each of a plurality of input positions;
provide the input sequence to the attention sub-layer and to the feed-forward sub-layer,
the attention sub-layer configured to generate an attended input sequence that includes a respective attended layer input for each of a plurality of output positions in an output sequence for the attention layer at least in part by applying an attention mechanism to the input sequence for the attention layer, and
the feed-forward sub-layer configured to generate a transformed input sequence that includes a respective transformed layer input for each of the plurality of output positions in the output sequence for the attention layer by using one or more feed-forward neural network layers included in the feed-forward sub-layer to process the input sequence for the attention layer, wherein the attention sub-layer and the feed-forward sub-layer are configured to operate in parallel with each other to generate the attended input sequence and the transformed input sequence, and wherein the operating in parallel comprises:
generating a fused matrix that includes a query linear transformation matrix associated with the attention sub-layer, a key linear transformation matrix associated with the attention sub-layer, a value linear transformation matrix associated with the attention sub-layer, and a weight matrix associated with the feed-forward sub-layer; and
performing a matrix multiplication between an input matrix representing the input sequence for the attention layer and the fused matrix to generate a matrix product representing the attended input sequence and the transformed input sequence; and
generate the output sequence for the attention layer by determining a combination of the attended input sequence and the transformed input sequence.

14. A method comprising:
receiving a network input; and
processing the network input using an attention neural network configured to perform a machine learning task to generate a network output for the machine learning task for the network input, wherein the attention neural network comprises an attention layers, wherein the attention layer comprises an attention sub-layer and a feed-forward sub-layer, and wherein the attention layer is configured to:
receive an input sequence for the attention layer comprising a respective layer input at each of a plurality of input positions;
provide the input sequence to the attention sub-layer and to the feed-forward sub-layer,
the attention sub-layer configured to generate an attended input sequence that includes a respective attended layer input for each of a plurality of output positions in an output sequence for the attention layer at least in part by applying an attention mechanism to the input sequence for the attention layer, and
the feed-forward sub-layer configured to generate a transformed input sequence that includes a respective transformed layer input for each of the plurality of output positions in the output sequence for the attention layer by using one or more feed-forward neural network layers included in the feed-forward sub-layer to process the input sequence for the attention layer, wherein the attention sub-layer and the feed-forward sub-layer are configured to operate in parallel with each other to generate the attended input sequence and the transformed input sequence, and wherein the operating in parallel comprises:
generating a fused matrix that includes a query linear transformation matrix associated with the attention sub-layer, a key linear transformation matrix associated with the attention sub-layer, a value linear transformation matrix associated with the attention sub-layer, and a weight matrix associated with the feed-forward sub-layer; and
performing a matrix multiplication between an input matrix representing the input sequence for the attention layer and the fused matrix to generate a matrix product representing the attended input sequence and the transformed input sequence; and
generate the output sequence for the attention layer by determining a combination of the attended input sequence and the transformed input sequence.

15. The method of claim 14, wherein determining the combination of the attended input sequence and the transformed input sequence comprises, for each of the plurality of output positions in the output sequence for the attention layer:
computing a sum of the respective attended layer input and the respective transformed layer input for the output position.

16. The method of claim 14, wherein the attention layer is further configured to provide the output sequence for the attention layer as input to a subsequent neural network layer in the attention neural network.

17. The method of claim 14, wherein the one or more feed-forward neural network layers included in the feed-forward sub-layer comprises two or more fully-connected layers separated by one or more non-linear activation layers.

18. The method of claim 14, wherein the attention sub-layer is configured to apply the attention mechanism by:
  applying a query linear transformation to the input sequence for the attention layer to generate a query vector for the respective layer input at each of the plurality of input positions,
  applying a key linear transformation to the input sequence for the attention layer to generate a key vector for the respective layer input at each of the plurality of input positions, and
  applying a value linear transformation to the input sequence for the attention layer to generate a value vector for the respective layer input at each of the plurality of input positions.

19. The method of claim 18, wherein generating the attended input sequence and the transformed input sequence comprises:
  obtaining the query linear transformation matrix that represents the query linear transformation to the input sequence for the attention layer to generate the query vector for each respective layer input at each of the plurality of input positions;
  obtaining the key linear transformation matrix that represents the key linear transformation to the input sequence for the attention layer to generate the key vector for each respective layer input at each of the plurality of input positions;
  obtaining the value linear transformation matrix that represents the value linear transformation to the input sequence for the attention layer to generate the value vector for each respective layer input at each of the plurality of input positions; and
  obtaining the weight matrix that represents corresponding weights of the one or more feed-forward neural network layers included in the feed-forward sub-layer.

* * * * *